(12) United States Patent
Miyazaki et al.

(10) Patent No.: US 10,203,568 B2
(45) Date of Patent: *Feb. 12, 2019

(54) LIQUID CRYSTAL DISPLAY DEVICE

(71) Applicant: Japan Display Inc., Minato-ku (JP)

(72) Inventors: Kayoko Miyazaki, Tokyo (JP); Jin Hirosawa, Tokyo (JP)

(73) Assignee: JAPAN DISPLAY INC., Minato-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/628,002

(22) Filed: Jun. 20, 2017

(65) Prior Publication Data

US 2017/0285417 A1    Oct. 5, 2017

Related U.S. Application Data

(63) Continuation of application No. 15/001,666, filed on Jan. 20, 2016, now Pat. No. 9,709,860.

(30) Foreign Application Priority Data

Jan. 22, 2015    (JP) ................................ 2015-010268

(51) Int. Cl.
*G02F 1/1343* (2006.01)
*G02F 1/1333* (2006.01)
(Continued)

(52) U.S. Cl.
CPC ...... *G02F 1/134309* (2013.01); *G02F 1/1337* (2013.01); *G02F 1/1368* (2013.01);
(Continued)

(58) Field of Classification Search
CPC .. G02F 1/1333; G02F 1/134363; G02F 1/136; G02F 1/136286; G02F 1/136227;
(Continued)

(56) References Cited

U.S. PATENT DOCUMENTS 6,266,116 B1    7/2001  Ohta et al.
9,709,860 B2 *  7/2017  Miyazaki .......... G02F 1/133345
(Continued)

FOREIGN PATENT DOCUMENTS

JP    6-222397    8/1994
JP    7-159807    6/1995
(Continued)

*Primary Examiner* — Thoi Duong
(74) *Attorney, Agent, or Firm* — Oblon, McClelland, Maier & Neustadt, L.L.P.

(57) ABSTRACT

A liquid crystal display device includes a gate line, a source line, a first common electrode opposed to the gate line and the source line, an interlayer insulating film covering the first common electrode, a pixel electrode including a main pixel electrode and a sub-pixel electrode, the pixel electrode formed on the interlayer insulating film, a second common electrode formed on the interlayer insulating film. The second common electrode includes a second main common electrode which has intermittence at a position adjacent to the sub-pixel electrode, and a second sub-common electrode which has intermittence at a position adjacent to the main pixel electrode.

15 Claims, 9 Drawing Sheets

(51) Int. Cl.
*G02F 1/1337* (2006.01)
*G02F 1/1362* (2006.01)
*G02F 1/1368* (2006.01)

(52) U.S. Cl.
CPC .. *G02F 1/133345* (2013.01); *G02F 1/136286* (2013.01); *G02F 2001/134318* (2013.01); *G02F 2001/134345* (2013.01)

(58) Field of Classification Search
CPC ............ G02F 1/1368; G02F 1/133345; G02F 1/134309; G02F 1/133707; G02F 1/134336; G02F 1/1362; G02F 1/1343; G02F 2001/134372; G02F 2001/134318; G02F 2001/134345; G02F 2201/123; G02F 2201/124; G02F 2201/12; G02F 2201/122; H01L 27/124; H01L 27/3276; H01L 27/3244; H01L 27/3248; H01L 29/41733; H01L 29/4908; H01L 29/78678; G09G 3/3677; G09G 3/3688; G09G 3/3648; G09G 2300/0426; G09G 2300/0439
USPC .......... 349/43, 143, 141, 138, 139, 147, 42; 438/151, 158, 149; 257/59, 72, E33.062; 345/92
See application file for complete search history.

(56) References Cited

U.S. PATENT DOCUMENTS

| | | |
|---|---|---|
| 2001/0010575 A1 | 8/2001 | Yoshida et al. |
| 2004/0165136 A1 | 8/2004 | Sugiyama et al. |
| 2005/0162893 A1 | 7/2005 | Yagi et al. |
| 2005/0206824 A1 | 9/2005 | Son et al. |
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2008/0309841 A1 | 12/2008 | Yagi et al. |
| 2011/0025937 A1 | 2/2011 | Yagi et al. |
| 2011/0234947 A1 | 9/2011 | Hirosawa |
| 2013/0016297 A1 | 1/2013 | Nakamura |
| 2014/0036214 A1 | 2/2014 | Hirosawa |
| 2014/0055430 A1 | 2/2014 | Hirosawa et al. |
| 2015/0268524 A1 | 9/2015 | Hirosawa |
| 2016/0062203 A1 | 3/2016 | Ono |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 5/2005 |
| JP | 2005-242307 | 9/2005 |
| JP | 2011-209454 | 10/2011 |
| WO | WO 2012/137540 A1 | 10/2012 |
| WO | WO 2012/137541 A1 | 10/2012 |

\* cited by examiner

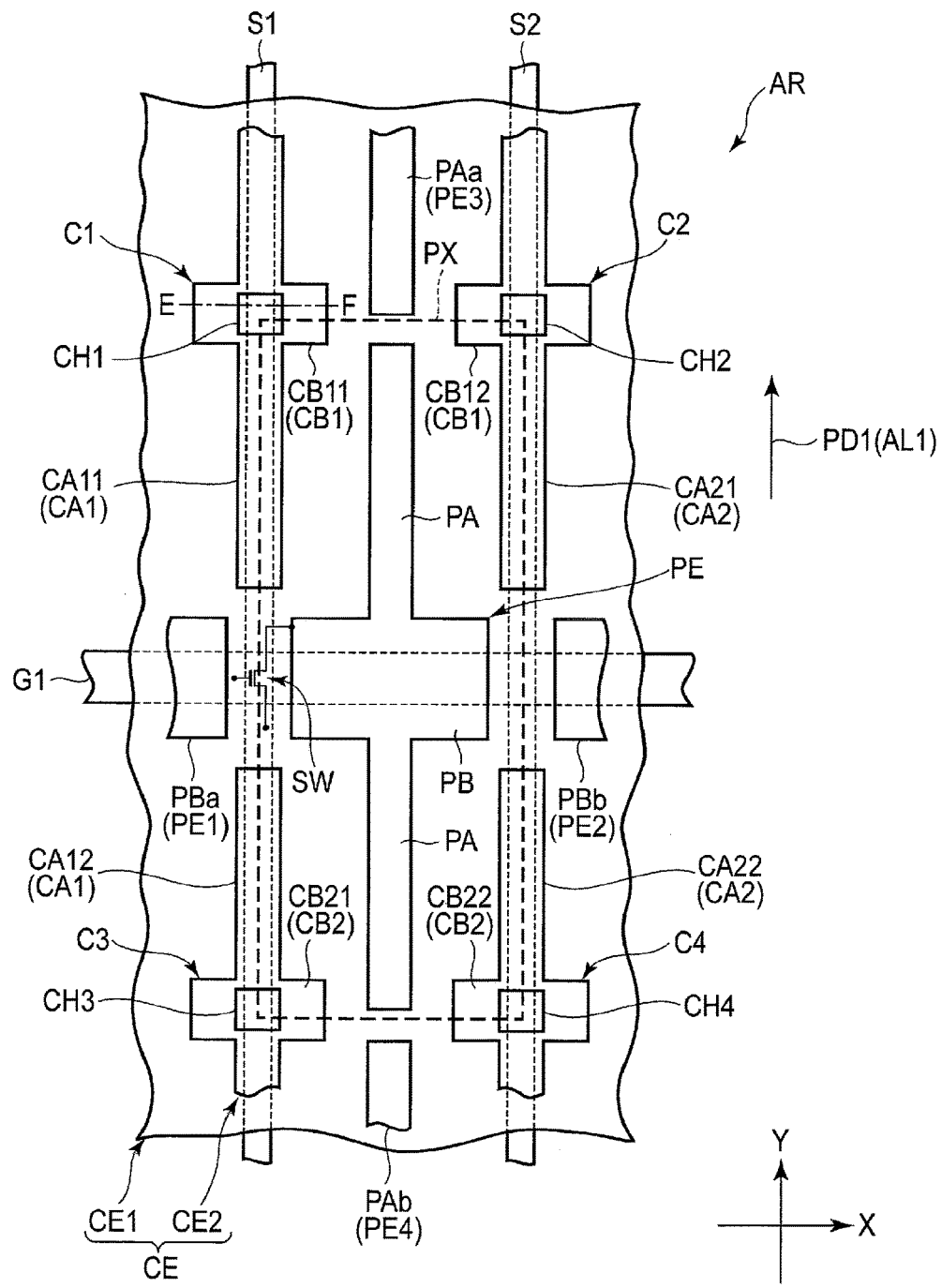
F I G. 2

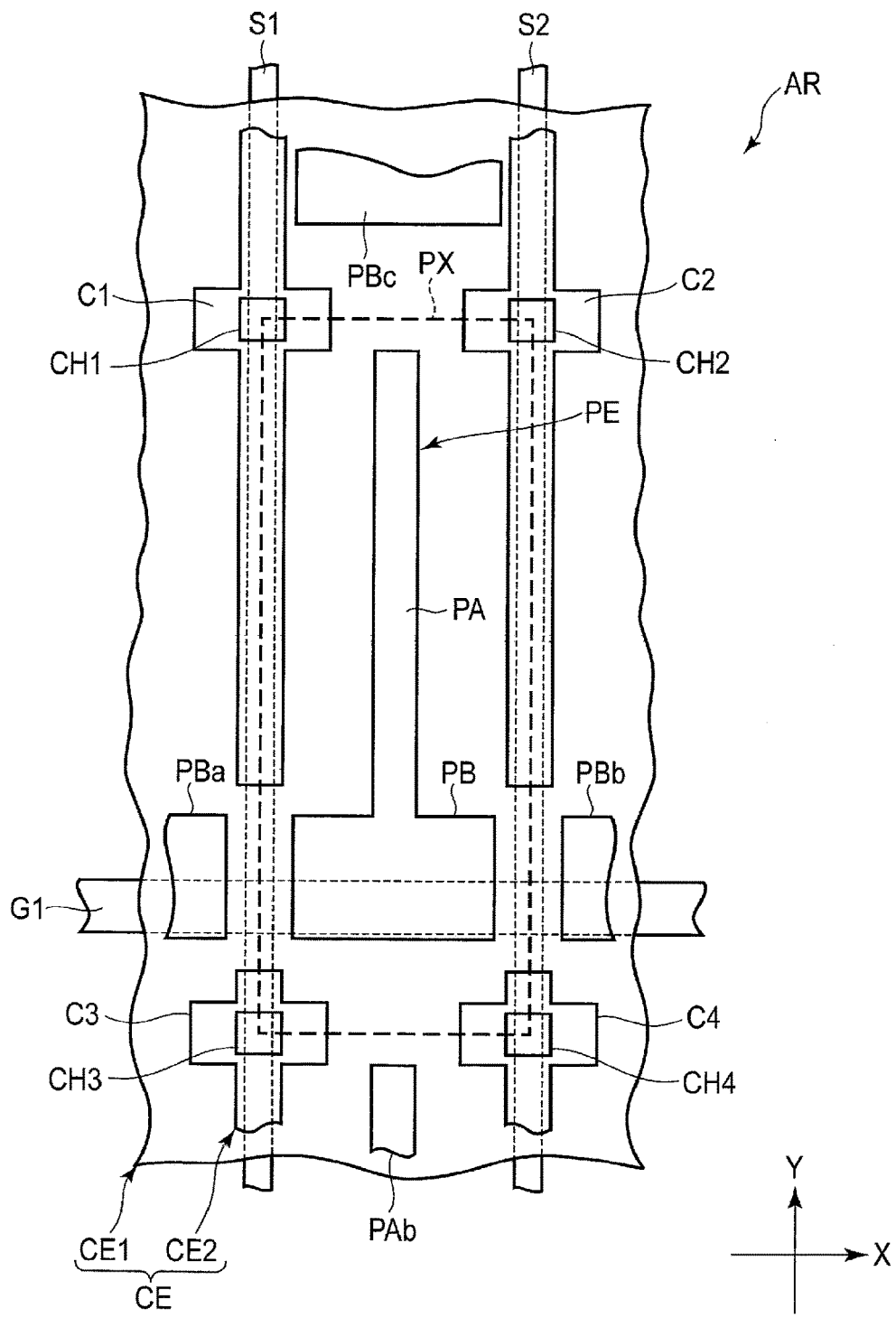
F I G. 7

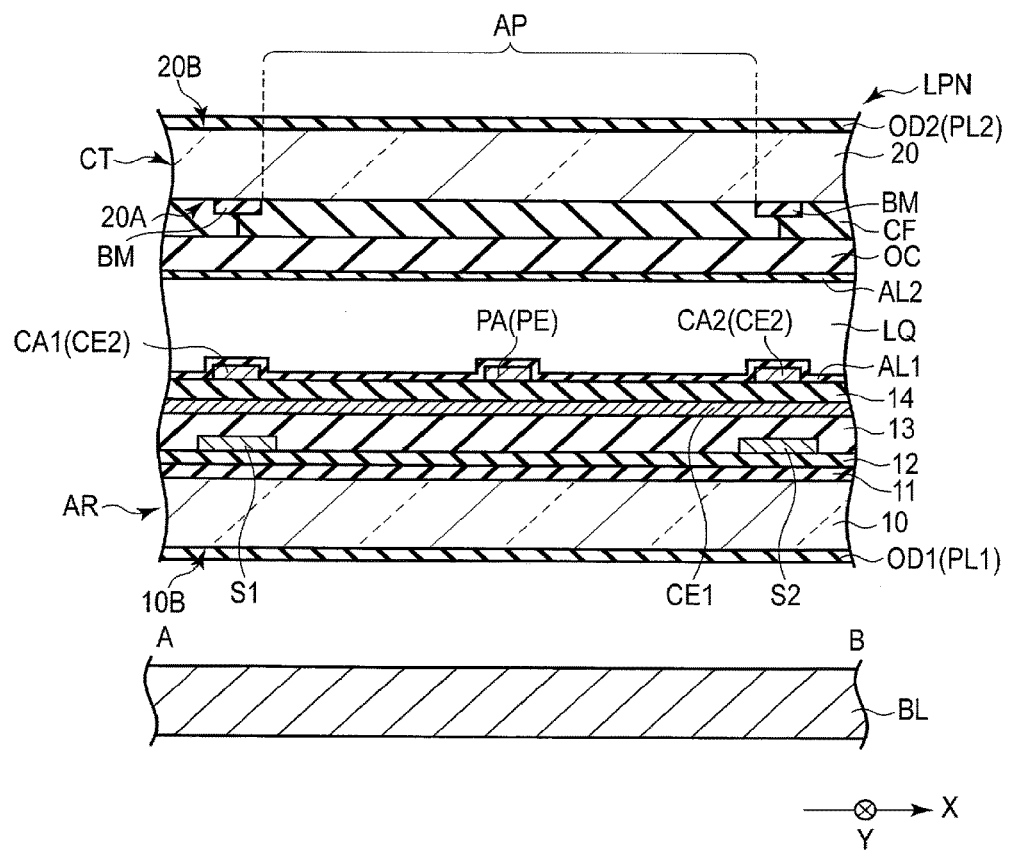
F I G. 9

LIQUID CRYSTAL DISPLAY DEVICE

CROSS-REFERENCE TO RELATED APPLICATIONS

This application is a continuation of and claims the benefit of priority from U.S. patent application Ser. No. 15/001,666, filed Jan. 20, 2016, which claims the benefit of priority from Japanese Patent Application No. 2015-010268, filed Jan. 22, 2015, the entire contents of which are incorporated herein by reference.

FIELD

Embodiments described herein relate generally to a liquid crystal display device.

BACKGROUND

Recently, in an active-matrix liquid crystal display device including a switching element in each pixel, a structure using a lateral electric field such as an in-plane switching (IPS) mode has been put into practical use. Such an array substrate for a liquid crystal display device of the lateral electric field mode includes a pixel electrode and a counter-electrode, and the alignment of liquid crystal molecules is controlled by a lateral electric field which is substantially parallel to the main surface of the array substrate.

With respect to this lateral electric field mode, there has been proposed a technique of controlling the alignment of liquid crystal molecules by producing an oblique electric field between a pixel electrode formed on the array substrate and a counter-electrode formed on the counter-substrate. Above all, a technique of producing an oblique electric field by combining a cross-shaped pixel electrode or an I-shaped pixel electrode and a common electrode disposed above source lines is proposed.

BRIEF DESCRIPTION OF THE DRAWINGS

FIG. 2 is a plan view which schematically illustrates a structure example of one pixel PX when an array substrate AR illustrated in FIG. 1 is viewed from a counter-substrate side.

FIG. 7 is a plan view which schematically illustrates another structure example of the pixel PX when the array substrate AR illustrated in FIG. 1 is viewed from the counter-substrate side.

FIG. 9 is a cross-sectional view which schematically shows another cross-sectional structure of the liquid crystal display panel LPN taken along a first direction X.

DETAILED DESCRIPTION

Figure 1:
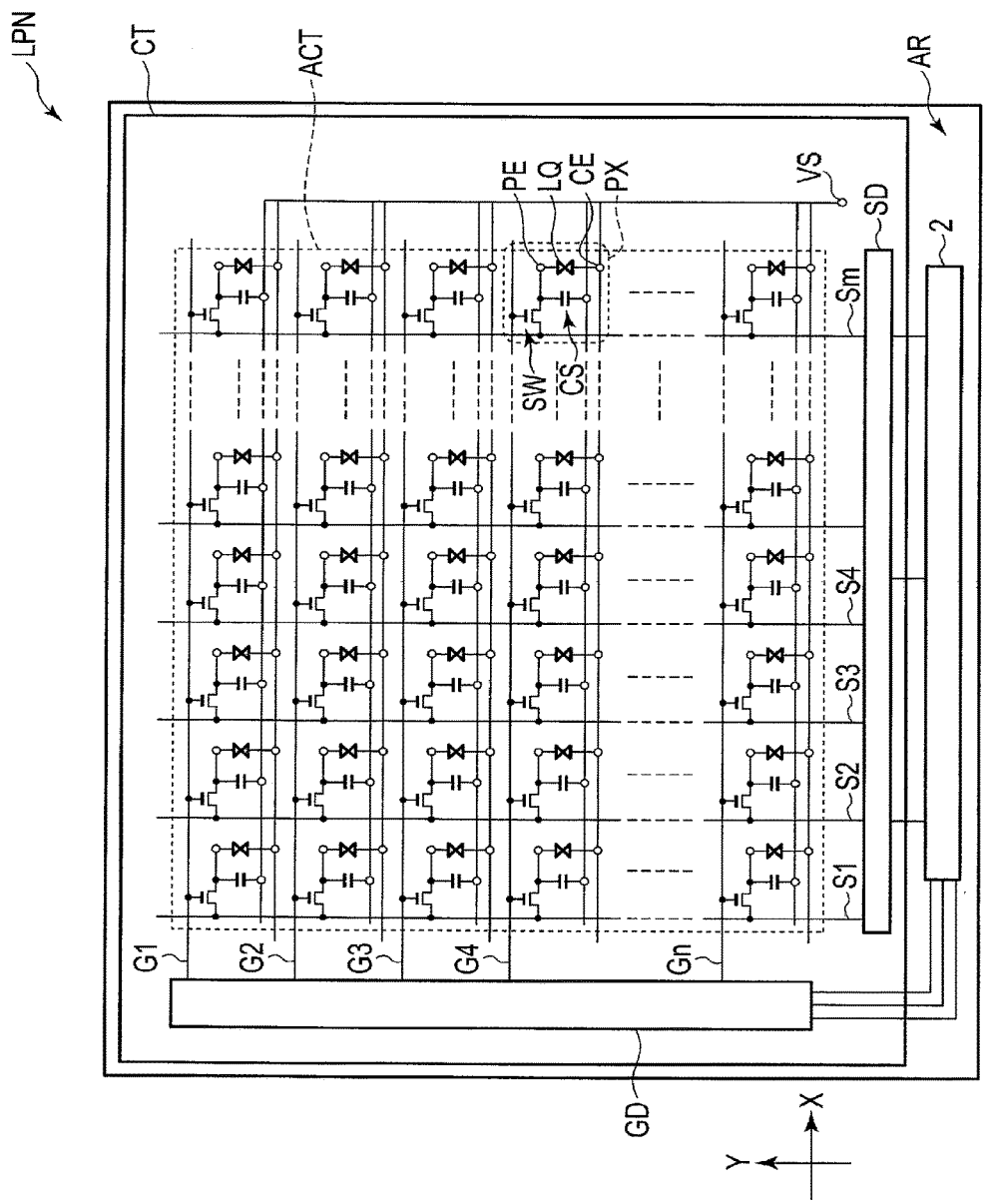
FIG. 1 is a view which schematically illustrates a structure and an equivalent circuit of a liquid crystal display device according to the present embodiment.

In general, according to one embodiment, a liquid crystal display device includes: a first substrate including a gate line extending in a first direction, a source line extending in a second direction crossing the first direction, a first common electrode opposed to the gate line and the source line, an interlayer insulating film covering the first common electrode, a pixel electrode including a main pixel electrode extending in the second direction and a sub-pixel electrode extending in the first direction, the pixel electrode formed on the interlayer insulating film, a second common electrode formed on the interlayer insulating film and having a same potential as the first common electrode, and a first alignment film covering the pixel electrode and the second common electrode; a second substrate including a second alignment film opposed to the first alignment film; and a liquid crystal layer held between the first substrate and the second substrate, the second common electrode including a second main common electrode which is opposed to the source line and has intermittence at a position adjacent to the sub-pixel electrode, and a second sub-common electrode which crosses the second main common electrode and has intermittence at a position adjacent to the main pixel electrode.

In general, according to one embodiment, a liquid crystal display device includes: a first substrate including a gate line extending in a first direction, a source line extending in a second direction crossing the first direction, a first common electrode opposed to the gate line and the source line, an interlayer insulating film covering the first common electrode, a pixel electrode including a main pixel electrode extending in the second direction and a sub-pixel electrode extending in the first direction, the pixel electrode formed on the interlayer insulating film, a second common electrode formed on the interlayer insulating film and having a same potential as the first common electrode, and a first alignment film covering the pixel electrode and the second common electrode; a second substrate including a second alignment film opposed to the first alignment film; and a liquid crystal layer held between the first substrate and the second substrate, the second common electrode including a plurality of segments each formed in an island shape and disposed around the pixel electrode.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements, which have functions identical or similar to the functions described in connection with preceding drawings, are denoted by the same reference numbers, and an overlapping detailed description thereof may be arbitrarily omitted.

FIG. 1 is a view which schematically illustrates a structure and an equivalent circuit of a liquid crystal display device according to the present embodiment.

The liquid crystal display device includes an active-matrix liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT corresponds to a region where the liquid crystal layer LQ is held between the array substrate AR and the counter-substrate CT, has a rectangular shape, for example, and is composed of a plurality of pixels PX arrayed in a matrix.

The liquid crystal display panel LPN includes, in the active area ACT, a plurality of gate lines G (G1 to Gn), a plurality of source lines S (S1 to Sm), etc. The gate lines G extend along a first direction X, for example. The source lines S extend along a second direction Y intersecting the first direction X, and cross the gate lines G. In this example, the first direction X and the second direction Y are orthogonal to each other. In one example, although the gate lines G extend substantially linearly in the first direction X, and the source lines S extend substantially linearly in the second direction Y, the gate lines G and the source lines S are not necessarily extended linearly, but part of them may be bent or diverged. Each of the gate lines G is led out to the outside of the active area ACT and is connected to a gate driver GD. Each of the source lines S is led out to the outside of the active area ACT and is connected to a source driver SD. At least parts of the gate driver GD and the source driver SD are formed on, for example, the array substrate AR, and are connected to a driving IC chip 2 in which a controller is embedded.

Each of the pixels PX includes a switching element SW, a pixel electrode PE, a common electrode CE, etc. A storage capacitance CS is formed between, for example, the pixel electrode PE and the common electrode CE.

The switching element SW is composed of, for example, an n-channel thin-film transistor (TFT). The switching element SW is electrically connected to the gate line G and the source line S. The switching element SW is of either a top gate type or a bottom gate type. Further, although a semiconductor layer of the switching element SW is formed of, for example, polysilicon, it may be formed of amorphous silicon and the like.

The pixel electrode PE is disposed in each pixel PX, and is electrically connected to the switching element SW. The common electrode CE has, for example, a common potential, and is disposed common to pixel electrodes PE of a plurality of pixels PX. A power supply module VS is formed, for example, on the outside of the active area ACT on the array substrate AR. The common electrode CE is led out to the outside of the active area ACT, and is electrically connected to the power supply module VS. The pixel electrodes PE and the common electrode CE may be formed of a transparent conductive material such as indium tin oxide (ITO) and indium zinc oxide (IZO), or may be formed of an opaque interconnect material such as aluminum (Al), titanium (Ti), silver (Ag), molybdenum (Mo), tungsten (W), copper (Cu) or chromium (Cr).

In the present embodiment, the liquid crystal display panel LPN is configured such that the pixel electrodes PE are formed on the array substrate AR, and at least a part of the common electrode CE is formed on the array substrate AR or counter-substrate CT, and the alignment of liquid crystal molecules included in the liquid crystal layer LQ is controlled by using an electric field which is produced between the pixel electrodes PE and the common electrode CE. The electric field, which is produced between the pixel electrodes PE and the common electrode CE, is an electric field slightly inclined to an X-Y plane defined by the first direction X and the second direction Y (or inclined to a substrate main surface) (or is an electric field substantially parallel to the substrate main surface).

FIG. 2 is a plan view which schematically illustrates a structure example of one pixel PX when the array substrate AR illustrated in FIG. 1 is viewed from the counter-substrate side. FIG. 2 is a plan view in the X-Y plane.

The array substrate AR includes a gate line G1, a source line S1, a source line S2, the switching element SW, the pixel electrode PE, a first common electrode CE1 and a second common electrode CE2 which are included in the common electrode CE, a first alignment film AL1, etc.

The gate line G1 extends along the first direction X. The source line S1 and the source line S2 are disposed at an interval in the first direction X, and each of the source line S1 and source line S2 extends in the second direction Y. As can be seen from the drawing, in the present embodiment, a storage capacitance line which traverses the pixel PX for forming the storage capacitance CS does not exist.

In the example illustrated, the pixel PX corresponds to an area depicted by a broken line in the drawing, and has a rectangular shape whose length in the first direction X is less than that in the second direction Y. The length of the pixel PX in the first direction X corresponds to a pitch between the source line S1 and the source line S2 in the first direction X, and the length of the pixel PX in the second direction Y corresponds to a pitch between the gate lines in the second direction Y. Note that the shape of the pixel PX is not limited to the example illustrated in the drawing.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line G1 is located at a substantially central portion of the pixel PX. The switching element SW which is disposed to correspond to the pixel PX is electrically connected to, for example, the gate line G1 and the source line S1.

The pixel electrode PE is located between the source line S1 and the source line S2 in the X-Y plane. The pixel electrode PE includes a main pixel electrode PA and a sub-pixel electrode PB. The main pixel electrode PA and the sub-pixel electrode PB are formed integral or continuous, and are electrically connected to each other. The main pixel electrode PA is located at a substantially middle point between the source line S1 and the source line S2, and linearly extends in the second direction Y to the vicinity of an upper side end portion of the pixel PX and to the vicinity of a lower side end portion of the pixel PX. The main pixel electrode PA is formed in a strip shape having a substantially uniform width in the first direction X. The sub-pixel electrode PB is located at a substantially central portion of the pixel PX, and linearly extends in the first direction X to the vicinity of a left side end portion of the pixel PX (i.e., near a place which overlaps the source line S1) and to the vicinity of a right side end portion of the pixel PX (i.e., near a place which overlaps the source line S2). That is, a part of the sub-pixel electrode PB is disposed at a position overlapping the gate line G1, and crosses the main pixel electrode PA at a middle portion of the main pixel electrode PA along the second direction Y. In other words, the pixel electrode PE illustrated is formed in a cross shape. Although the sub-pixel electrode PB is formed in a strip shape having a substantially uniform width in the second direction Y, the shape of the sub-pixel electrode PB is not limited to the example illustrated in the drawing. The pixel electrode PE is electrically connected to the switching element SW in the sub-pixel electrode PB.

The first common electrode CE1 is opposed to the pixel electrode PE, and is disposed over substantially the entirety of the pixel PX. Further, the first common electrode CE1 is opposed to the source line S1 and the source line S2, extends in the first direction X beyond the source line S1 and the source line S2, and is disposed also on pixels neighboring the pixel PX in the first direction X. Furthermore, the first common electrode CE1 is opposed to the gate line G1, extends in the second direction Y beyond the gate line G1, and is also disposed on pixels neighboring the pixel PX in the second direction Y.

The second common electrode CE2 is electrically connected to the first common electrode CE1, and has the same potential as the first common electrode CE1. The second common electrode CE2 includes second main common electrodes CA1 and CA2, and second sub-common electrodes CB1 and CB2. The second common electrode CE2 comprises four segments C1 to C4 arranged in the periphery of the pixel electrode PE for one pixel PX. Each of these segments C1 to C4 is formed in an island shape. In the example illustrated, the segments C1 and C2 are aligned in the first direction X, and the segments C3 and C4 are aligned in the first direction X. Also, the segments C1 and C3 are aligned along the source line S1 in the second direction Y, and the segments C2 and C4 are aligned along the source line S2 in the second direction Y. Also, the segments C1 to C4 are opposed to the first common electrode CE1. The segment C1 is in contact with the first common electrode CE1 through a contact hole CH1, the segment C2 is in contact with the first common electrode CE1 through a contact hole CH2, the segment C3 is in contact with the first common electrode CE1 through a contact hole CH3, and the segment C4 is in contact with the first common electrode CE1 through a contact hole CH4. The contact holes CH1 and CH3 are formed at positions which overlap the source line S1, and contact holes CH2 and CH4 are formed at positions which overlap the source line S2.

All of these segments C1 to C4 are formed in the same shape, and in the example illustrated, each of them is formed in a cross shape. That is, the segment C1 includes a main common electrode CA11 extending in the second direction Y, and a sub-common electrode CB11 extending in the first direction X and crossing the main common electrode CA11. Similarly, the segment C2 includes a main common electrode CA21 and a sub-common electrode CB12, the segment C3 includes a main common electrode CA12 and a sub-common electrode CB21, and the segment C4 includes a main common electrode CA22 and a sub-common electrode CB22. The contact hole CH1 is formed at a place where the main common electrode CA11 and the sub-common electrode CB11 cross each other. The contact hole CH2 is formed at a place where the main common electrode CA21 and the sub-common electrode CB12 cross each other. The contact hole CH3 is formed at a place where the main common electrode CA12 and the sub-common electrode CB21 cross each other. The contact hole CH4 is formed at a place where the main common electrode CA22 and the sub-common electrode CB22 cross each other.

The main common electrode CA11 and the main common electrode CA12 are parts of the second main common electrode CA1, are opposed to the source line S1, and are located on the same straight line along the second direction Y. The main common electrode CA21 and the main common electrode CA22 are parts of the second main common electrode CA2, are opposed to the source line S2, and are located on the same straight line along the second direction Y. Each of the second main common electrode CA1 and the second main common electrode CA2 is formed in a strip shape having a substantially uniform width in the first direction X. The electrode width of the second main common electrode CA1 in the first direction X is greater than or equal to the line width of the source line S1 in the first direction X. The electrode width of the second main common electrode CA2 in the first direction X is greater than or equal to the line width of the source line S2 in the first direction X. The sub-common electrode CB11 and the sub-common electrode CB12 are parts of the second sub-common electrode CB1, and are located on the same straight line along the first direction X. The sub-common electrode CB21 and the sub-common electrode CB22 are parts of the second sub-common electrode CB2, and are located on the same straight line along the first direction X. Each of the second sub-common electrode CB1 and the second sub-common electrode CB2 is formed in a strip shape having a substantially uniform width in the second direction Y.

In other words, each of the second main common electrode CA1 which is located on the left side end portion of the pixel PX shown and the second main common electrode CA2 which is located on the right side end portion of the pixel PX shown has intermittence at a position opposed to the sub-pixel electrode PB. Also, each of the second sub-common electrode CB1 which is located on the upper side end portion of the pixel PX shown and the second sub-common electrode CB2 which is located on the lower side end portion of the pixel PX shown has intermittence at a position opposed to the main pixel electrode PA.

More specifically, the second main common electrode CA1 has intermittence between the sub-pixel electrode PB of the pixel electrode PE shown and a sub-pixel electrode PBa of a pixel electrode PE1, which is adjacent on the left side of the pixel electrode PE in the first direction X. The second main common electrode CA2 has intermittence between the sub-pixel electrode PB of the pixel electrode PE shown and a sub-pixel electrode PBb of a pixel electrode PE2, which is adjacent on the right side of the pixel electrode PE in the first direction X. The second sub-common electrode CB1 has intermittence between the main pixel electrode PA of the pixel electrode PE shown and a main pixel electrode PAa of a pixel electrode PE3, which is adjacent on the upper side of the pixel electrode PE in the second direction Y. The second sub-common electrode CB2 has intermittence between the main pixel electrode PA of the pixel electrode PE shown and a main pixel electrode PAb of a pixel electrode PE4, which is adjacent on the lower side of the pixel electrode PE in the second direction Y.

Further, in the example illustrated, although neither of the sub-pixel electrode PB and the sub-pixel electrode PBa extends between the main common electrode CA11 and the main common electrode CA12, at least one of the sub-pixel electrode PB and the sub-pixel electrode PBa may extend between the main common electrode CA11 and the main common electrode CA12. Also, although neither of the sub-pixel electrode PB and the sub-pixel electrode PBb extends between the main common electrode CA21 and the main common electrode CA22, at least one of the sub-pixel electrode PB and the sub-pixel electrode PBb may extend between the main common electrode CA21 and the main common electrode CA22. Although the main pixel electrode PAa extends between the sub-common electrode CB11 and the sub-common electrode CB12, both of the main pixel electrode PA and the main pixel electrode PAa may extend between the sub-common electrode CB11 and the sub-common electrode CB12, or neither of the main pixel electrode PA and the main pixel electrode PAa needs to extend between the sub-common electrode CB11 and the sub-common electrode CB12. Although the main pixel electrode PA extends between the sub-common electrode CB21 and the sub-common electrode CB22, both of the main pixel electrode PA and the main pixel electrode PAb may extend between the sub-common electrode CB21 and the sub-common electrode CB22, or neither of the main pixel electrode PA and the main pixel electrode PAb needs to extend between the sub-common electrode CB21 and the sub-common electrode CB22.

The second common electrode CE2 having such a structure defines the pixel PX, is separated from the pixel electrode PE, and surrounds the pixel electrode PE by the second main common electrode CA1, the second main common electrode CA2, the second sub-common electrode CB1, and the second sub-common electrode CB2.

In the array substrate AR, the pixel electrode PE and the second common electrode CE2 are covered with the first alignment film AL1. The first alignment film AL1 is subjected to alignment treatment in a first alignment treatment direction PD1 for initially aligning the liquid crystal molecules of the liquid crystal layer LQ. The first alignment treatment direction PD1 is substantially parallel to the second direction Y.

Figure 3:
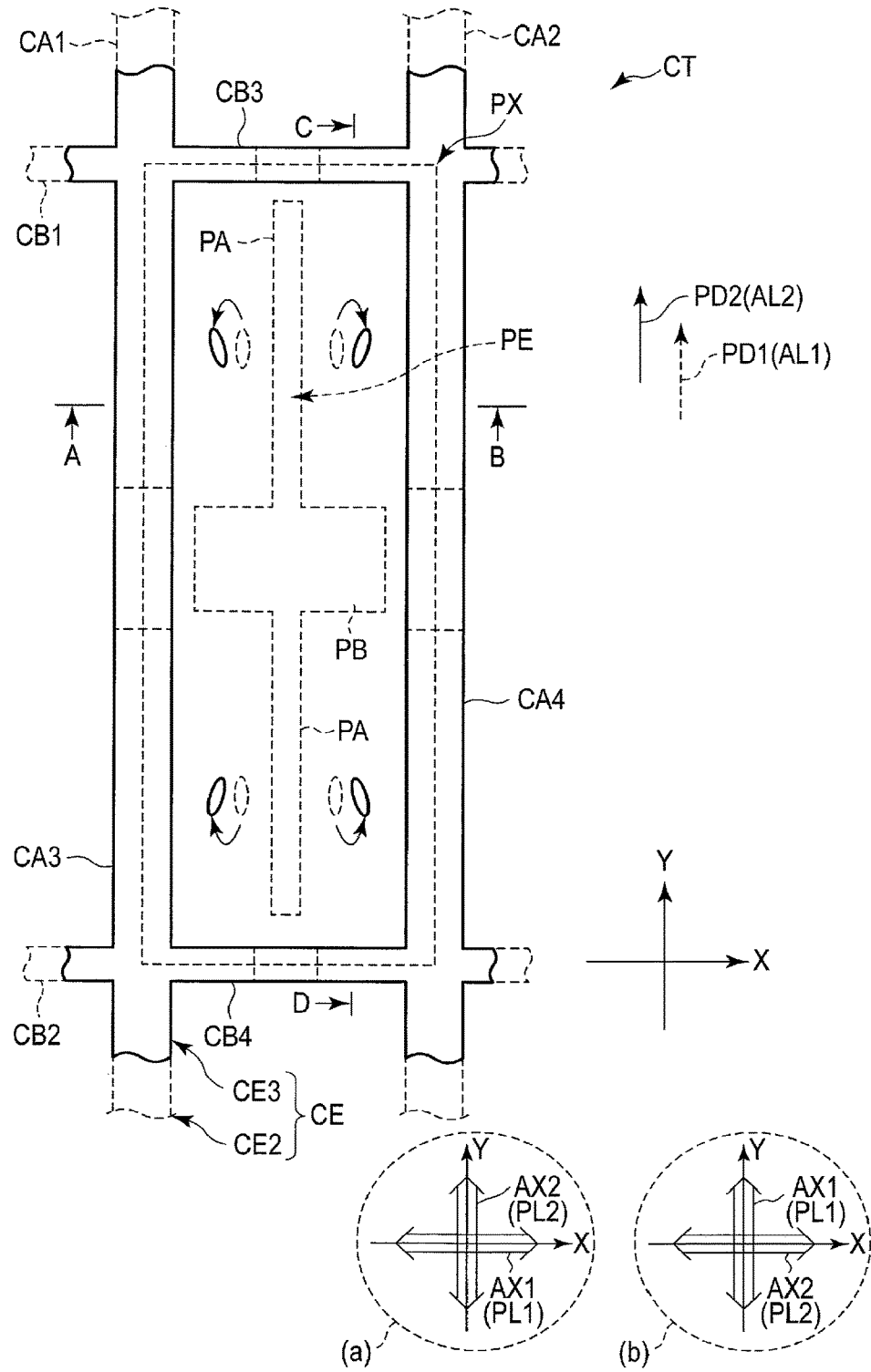
FIG. 3 is a plan view which schematically illustrates a structure example of one pixel PX in a counter-substrate CT shown in FIG. 1.

FIG. 3 is a plan view which schematically illustrates a structure example of one pixel PX in the counter-substrate CT shown in FIG. 1. FIG. 3 is a plan view in the X-Y plane. Here, FIG. 3 illustrates only the structure that is necessary for the description, and only the pixel electrode PE and the second common electrode CE2 of the array substrate are shown by broken lines.

The counter-substrate CT comprises a third common electrode CE3 which is included in the common electrode CE. The third common electrode CE3 includes third main common electrodes CA3 and CA4, and third sub-common electrodes CB3 and CB4. The third main common electrodes CA3 and CA4 and the third sub-common electrodes CB3 and CB4 are formed integral or continuous, and are electrically connected to each other. The third main common electrodes CA3 and CA4 extend linearly in the second direction Y, and the third sub-common electrodes CB3 and CB4 extend linearly in the first direction X. That is, the third common electrode CE3 is formed in a lattice shape which defines the pixel PX. Further, the third common electrode CE3 is electrically connected to the first common electrode CE1 and the second common electrode CE2 in, for example, the outside of the active area, and has the same potential as the first common electrode CE1 and the second common electrode CE2.

The third main common electrode CA3 is opposed to the second main common electrode CA1, and extends parallel to the second main common electrode CA1. The third main common electrode CA3 is formed in a strip shape having a substantially uniform width in the first direction X. The width of the third main common electrode CA3 is equal to the width of the second main common electrode CA1. The third main common electrode CA4 is opposed to the second main common electrode CA2, and extends parallel to the second main common electrode CA2. The third main common electrode CA4 is formed in a strip shape having a substantially uniform width in the first direction X. The width of the third main common electrode CA4 is equal to the width of the second main common electrode CA2.

The third sub-common electrode CB3 is opposed to the second sub-common electrode CB1, and extends parallel to the second sub-common electrode CB1. The third sub-common electrode CB3 is formed in a strip shape having a substantially uniform width in the second direction Y. The width of the third sub-common electrode CB3 is equal to the width of the second sub-common electrode CB1. The third sub-common electrode CB4 is opposed to the second sub-common electrode CB2, and extends in parallel to the second sub-common electrode CB2. The third sub-common electrode CB4 is formed in a strip shape having a substantially uniform width in the second direction Y. The width of the third sub-common electrode CB4 is equal to the width of the second sub-common electrode CB2.

In the counter-substrate CT, the third common electrode CE3 is covered with a second alignment film AL2. The second alignment film AL2 is subjected to alignment treatment in a second alignment treatment direction PD2 for initially aligning the liquid crystal molecules of the liquid crystal layer LQ. The second alignment treatment direction PD2 is parallel to the first alignment treatment direction PD1. In the example illustrated, the second alignment treatment direction PD2 is identical to the first alignment treatment direction PD1. It should be noted that the first alignment treatment direction PD1 and the second alignment treatment direction PD2 may be opposite to each other.

Figure 4:
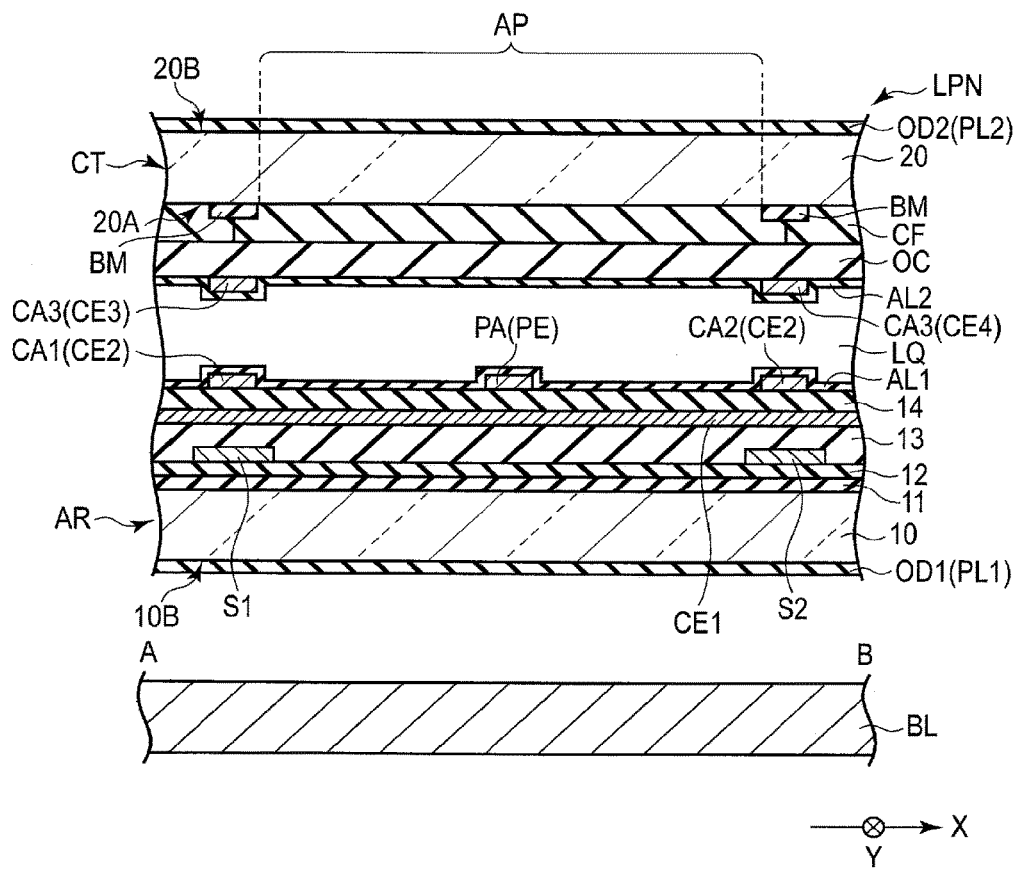
FIG. 4 is a cross-sectional view, taken along line A-B in FIG. 3, which schematically illustrates a cross-sectional structure of a liquid crystal display panel LPN.
Figure 5:
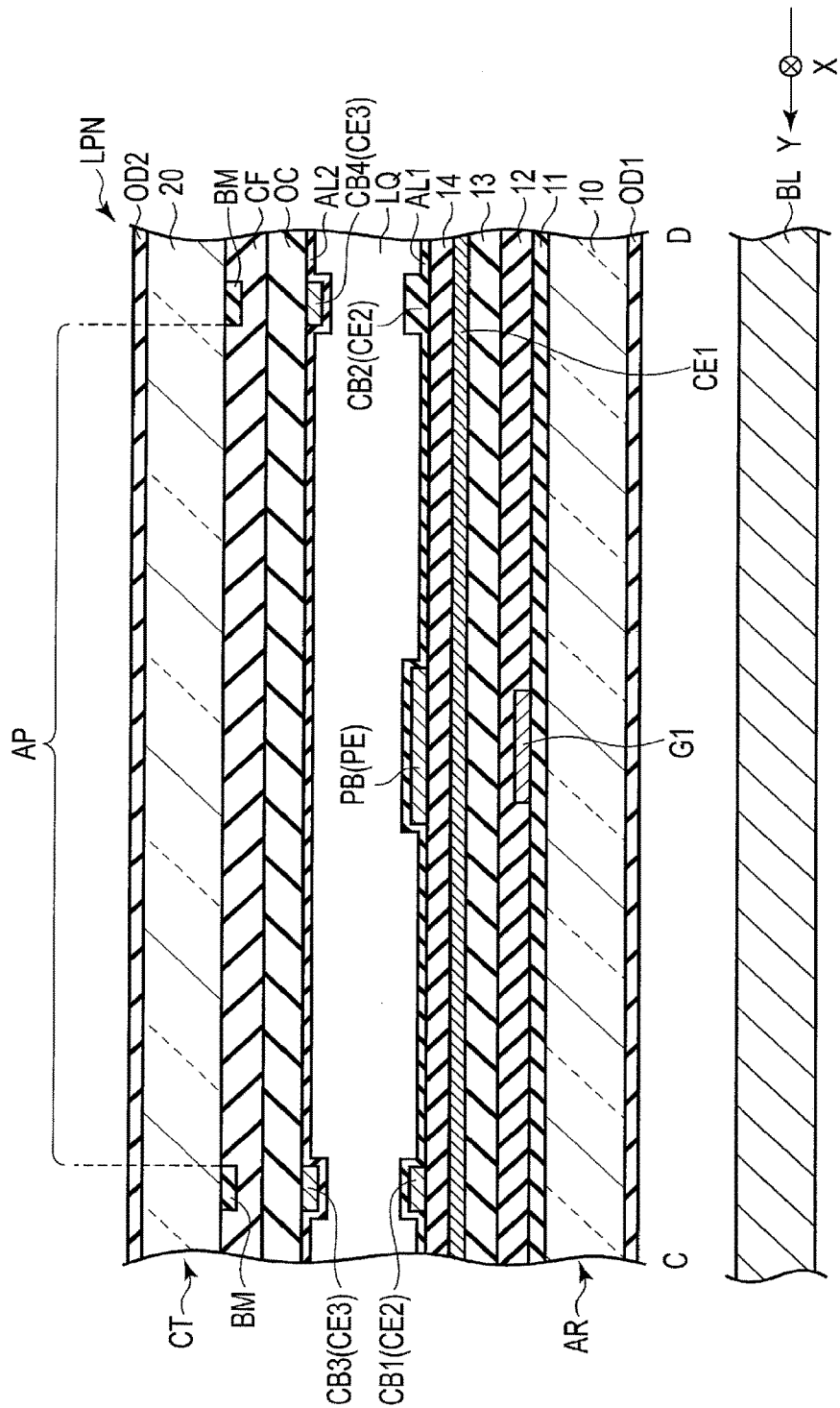
FIG. 5 is a cross-sectional view, taken along line C-D in FIG. 3, which schematically illustrates a cross-sectional structure of the liquid crystal display panel LPN.

FIG. 4 is a cross-sectional view, taken along line A-B in FIG. 3, which schematically illustrates a cross-sectional structure of the liquid crystal display panel LPN. FIG. 5 is a cross-sectional view, taken along line C-D in FIG. 3, which schematically illustrates a cross-sectional structure of the liquid crystal display panel LPN.

A backlight unit BL, which illuminates the liquid crystal display panel LPN, is disposed on the back side of the array substrate AR. Various types of backlight units can be applied as the backlight unit BL, but explanation of a detailed structure of the backlight unit is omitted here.

The array substrate AR is formed by using a first insulating substrate 10 having light transmissivity. The array substrate AR includes, on the inside of the first insulating substrate 10, that is, on the side facing the counter-substrate CT, the gate line G1, the source line S1, the source line S2, the pixel electrode PE, the first common electrode CE1, the second common electrode CE2, a first insulating film 11, a second insulating film 12, a third insulating film 13, a fourth insulating film 14, the first alignment film AL1, etc.

A semiconductor layer of the switching element not shown is formed between, for example, the first insulating substrate 10 and the first insulating film 11. The gate line G1 is formed on the first insulating film 11, and is covered with the second insulating film 12. The source line S1 and the source line S2 are formed on the second insulating film 12, and are covered with the third insulating film 13.

The first common electrode CE1 is formed on the third insulating film 13, and is covered with the fourth insulating film 14. The first common electrode CE1 is opposed to the source line S1 and the source line S2 via the third insulating film 13. Also, the first common electrode CE1 is opposed to the gate line G1 via the second insulating film 12 and the third insulating film 13.

The main pixel electrode PA and the sub-pixel electrode PB of the pixel electrode PE, and the second main common electrodes CA1 and CA2 and the second sub-common electrodes CB1 and CB2 of the second common electrode CE2 are formed on the fourth insulating film 14, and are covered with the first alignment film AL1. The main pixel electrode PA is located between the second main common electrode CA1 and the second main common electrode CA2. The sub-pixel electrode PB is located between the second sub-common electrode CB1 and the second sub-common electrode CB2. Also, the sub-pixel electrode PB is located immediately above the gate line G1. Such pixel electrode PE is opposed to the first common electrode CE1 via the fourth insulating film 14. The second main common electrode CA1 is located immediately above the source line S1, and the second main common electrode CA2 is located immediately above the source line S2. Such second common electrode CE2 is opposed to the first common electrode CE1 via the fourth insulating film 14.

The first common electrode CE1, the pixel electrode PE, and the second common electrode CE2, are formed of, for example, a transparent conductive material such as indium tin oxide (ITO) and indium zinc oxide (IZO).

The second insulating film 12 corresponds to a first interlayer insulating film which covers the gate line G1. The third insulating film 13 corresponds to a second interlayer insulating film which covers the source line S1 and the source line S2. The fourth insulating film 14 corresponds to a third interlayer insulating film which covers the first common electrode CE1. The first insulating film 11, the second insulating film 12, and the fourth insulating film 14 are formed of an inorganic material such as silicon nitride or silicon oxide. The third insulating film 13 is an organic insulating film formed by an organic material such as resin material.

The first alignment film AL1 is disposed on the surface of the array substrate AR, which is opposed to the counter-substrate CT, and extends over substantially the entirety of the active area ACT. The first alignment film AL1 covers the pixel electrode PE and the second common electrode CE2, and is also disposed on the fourth insulating film 14. The first alignment film AL1 is formed of a material which exhibits horizontal alignment properties.

The counter-substrate CT is formed by using a second insulating substrate 20 having light transmissivity. The counter-substrate CT includes a light-shielding layer BM, a color filter CF, an overcoat layer OC, the third common electrode CE3, the second alignment film AL2, etc., on the inside of the second insulating substrate 20, that is, on the side facing the array substrate AR.

The light-shielding layer BM is formed on an inner surface 20A of the second insulating substrate 20, which is opposed to the array substrate AR, defines the pixel PX, and forms an aperture AP opposed to the pixel electrode PE. That is, the light-shielding layer BM is disposed to be directly above an interconnection part such as the source lines S1 and S2, gate line G1, and switching element SW. In the example illustrated, the light-shielding layer BM includes portions which are located above the source lines S1 and S2 or the second main common electrodes CA1 and CA2 and extend in the second direction Y, and portions which are located above the second sub-common electrodes CB1 and CB2 and extend in the first direction X, and is formed in a lattice shape.

The color filter CF is disposed to correspond to the pixel PX. That is, the color filter CF is disposed on the inner side (aperture AP) defined by the light-shielding layer BM on the inner surface 20A of the second insulating substrate 20, and part of the color filter CF overlaps the light-shielding layer BM. Color filters CF, which are disposed in the pixels PX neighboring in the first direction X, have mutually different colors. For example, the color filters CF are formed of resin materials which are colored in the three primary colors of red, blue and green. A red color filter, which is formed of a resin material colored in red, is disposed to correspond to a red pixel. A blue color filter, which is formed of a resin material colored in blue, is disposed to correspond to a blue pixel. A green color filter, which is formed of a resin material colored in green, is disposed to correspond to a green pixel. The boundaries between the color filters CF overlap the light-shielding layer BM. The overcoat layer OC covers the color filters CF. The overcoat layer OC is formed of, for example, a transparent resin material.

The third main common electrodes CA3 and CA4, and the third sub-common electrodes CB3 and CB4 of the third common electrode CE3 are formed on the side of the overcoat layer OC facing the array substrate AR, and are all located below the light-shielding layer BM. The third main common electrode CA3 is located above the source line S1, and is opposed to the second main common electrode CA1. The third main common electrode CA4 is located above the source line S2, and is opposed to the second main common electrode CA2. The third sub-common electrode CB3 is opposed to the second sub-common electrode CB1. The third sub-common electrode CB4 is opposed to the second sub-common electrode CB2. In the aperture AP, regions between the pixel electrode PE and the second and third common electrodes CE2 and CE3 correspond to transmissive regions through which backlight can pass. The third common electrode CE3 is formed of a transparent, electrically conductive material such as ITO or IZO.

The second alignment film AL2 is disposed on the surface of the counter-substrate CT facing the array substrate AR, and extends over substantially the entirety of the active area ACT. The second alignment film AL2 covers the third common electrode CE3 and the overcoat layer OC. The second alignment film AL2 is formed of a material which exhibits horizontal alignment properties.

The array substrate AR and the counter-substrate CT as described above are arranged such that the first alignment film AL1 and the second alignment film AL2 are opposed to each other. At this time, a predetermined cell gap, for example, a cell gap of 2 to 7 μm, is formed between the first alignment film AL1 of the array substrate AR and the second alignment film AL2 of the counter-substrate CT by a columnar spacer integrally formed on either one of the substrates with a resin material. The array substrate AR and the counter-substrate CT are adhered to each other by a sealant on the outside of the active area ACT in a state where the predetermined cell gap is created therebetween. The liquid crystal layer LQ is held between the array substrate AR and the counter-substrate CT, and is disposed between the first alignment film AL1 and the second alignment film AL2. The liquid crystal layer LQ includes liquid crystal molecules LM, and is composed of, for example, a liquid crystal material with positive dielectric anisotropy.

A first optical element OD1 is disposed on an outer surface 10B of the first insulating substrate 10. The first optical element OD1 includes a first polarizing plate PL1 having a first polarization axis AX1. In the meantime, another optical element, such as a retardation plate, may be disposed between the first polarizing plate PL1 and the first insulating substrate 10. A second optical element OD2 is disposed on an outer surface 20B of the second insulating substrate 20. The second optical element OD2 includes a second polarizing plate PL2 having a second polarization axis AX2. In the meantime, another optical element, such as a retardation plate, may be disposed between the second polarizing plate PL2 and the second insulating substrate 20.

The first polarization axis AX1 of the first polarizing plate PL1 and the second polarization axis AX2 of the second polarization plate PL2 are in a crossed-Nicol relationship in which they are substantially orthogonal to each other. In an example shown in (a) of FIG. 3, the first polarizing plate PL1 is disposed such that the first polarization axis AX1 thereof is parallel to the first direction X, and the second polarizing plate PL2 is disposed such that the second polarization axis AX2 thereof is parallel to the second direction Y. In an example shown in (b) of FIG. 3, the second polarizing plate PL2 is disposed such that the second polarization axis AX2 thereof is parallel to the first direction X, and the first polarizing plate PL1 is disposed such that the first polarization axis AX1 thereof is parallel to the second direction Y.

Figure 6:
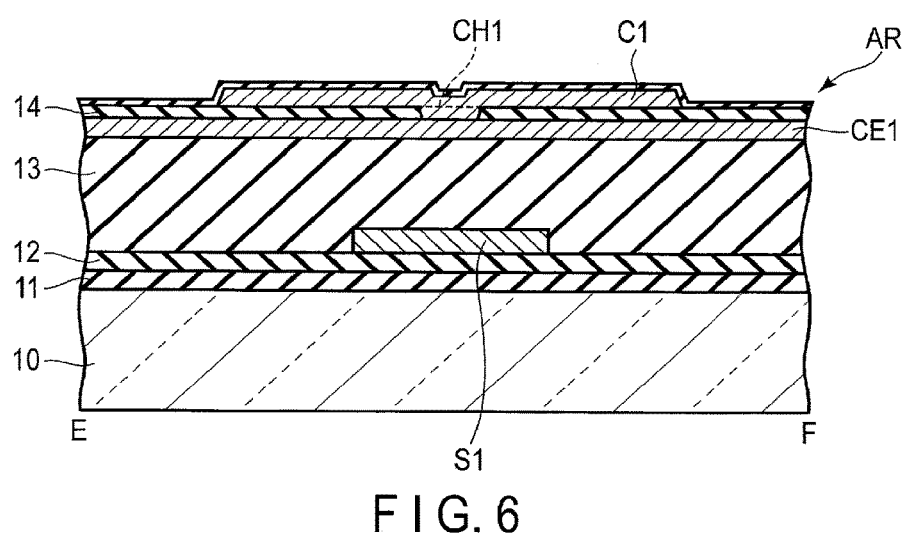
FIG. 6 is a cross-sectional view, taken along line E-F in FIG. 2, which schematically illustrates a cross-sectional structure of the array substrate AR.

FIG. 6 is a cross-sectional view, taken along line E-F in FIG. 2, which schematically illustrates a cross-sectional structure of the array substrate AR.

In the array substrate AR, the segment C1 of the second common electrode CE2 is formed on the fourth insulating film 14, and is opposed to the first common electrode CE1 immediately above the source line S1. The first segment C1 is in contact with the first common electrode CE1 via the contact hole CH1 which penetrates the fourth insulating film 14.

Consequently, the segment C1 is electrically connected to the first common electrode CE1. Similarly, the other segments of the second common electrode CE2 are electrically connected to the first common electrode CE1 through the respective contact holes which penetrate the fourth insulating film 14.

Next, the operation of the liquid crystal display panel LPN having the above-described structure will be described.

Specifically, in a state in which no voltage is applied to the liquid crystal layer LQ, that is, in a state (off-time) in which no electric field is produced between the pixel electrode PE and the common electrode CE (first common electrode CE1, second common electrode CE2, and third common electrode CE3), the liquid crystal molecules LM of the liquid crystal layer LQ are initially aligned, as indicated by broken lines in FIG. 3, such that the major axes thereof are initially aligned substantially parallel to the second direction Y in the X-Y plane. The off-time as described above corresponds to the initial alignment state, and the alignment direction (the second direction Y in this example) of the liquid crystal molecules LM at the off-time corresponds to the initial alignment direction.

At the off-time, part of backlight from the backlight unit BL passes through the first polarizing plate PL1, and enters the liquid crystal display panel LPN. The light, which has entered the liquid crystal display panel LPN, is linearly polarized light which is orthogonal to the first polarization axis AX1 of the first polarizing plate PL1. The polarized state of the linearly polarized light hardly varies when the light passes through the liquid crystal layer LQ at the off-time. Therefore, the linearly polarized light which has passed through the liquid crystal display panel LPN is absorbed by the second polarizing plate PL2 which is in the crossed-Nicol relationship with respect to the first polarizing plate PL1 (black display).

Meanwhile, in a state in which a voltage is applied to the liquid crystal layer LQ, that is, in a state (on-time) in which a potential difference is produced between the pixel electrode PE and the common electrode CE, an electric field, which is substantially parallel to the substrate main surface, is produced between the pixel electrode PE and the second common electrode CE2, and an oblique electric field, which is inclined to the substrate main surface, is produced between the pixel electrode PE and the third common electrode CE3. The liquid crystal molecules LM are affected by the electric field between the pixel electrode PE and the common electrode CE, and the alignment state of the liquid crystal modules LM is varied. In the example illustrated in FIG. 3, in a region between the pixel electrode PE and the third main common electrode CA3, the liquid crystal molecule LM in the lower-half region rotates clockwise relative to the second direction Y, and is aligned to be oriented to the lower left in this figure, and the liquid crystal molecule LM in the upper-half region rotates counterclockwise relative to the second direction Y, and is aligned to be oriented to the upper left in this figure. In a region between the pixel electrode PE and the third main common electrode CA4, the liquid crystal molecule LM in the lower-half region rotates counterclockwise relative to the second direction Y, and is aligned to be oriented to the lower right in this figure, and the liquid crystal molecule LM in the upper-half region rotates clockwise relative to the second direction Y, and is aligned to be oriented to the upper right in this figure. In this manner, in each pixel PX, the liquid crystal molecules LM at the on-time are aligned in a plurality of directions, with boundaries at positions overlapping the pixel electrode PE, and domains are formed in the respective alignment directions. Specifically, a plurality of domains are formed in one pixel PX. Thereby, in the pixel PX, transmissive regions, through which light from the backlight unit BL can pass, are formed between the pixel electrode PE and the common electrode CE.

At such on-time, the polarized state of the linearly polarized light which has entered the liquid crystal display panel LPN varies depending on the alignment state of the liquid crystal molecules LM when the light passes through the liquid crystal layer LQ. For this reason, at the on-time, at least part of the light which has passed through the liquid crystal layer LQ is transmitted through the second polarizing plate PL2 (white display). However, at a position overlapping the pixel electrode PE and the common electrode CE, since the liquid crystal molecules LM are kept in the initial alignment state, black display is effected, as in the case of the off-time.

Further, at the on-time, the pixel electrode PE (or the other electrodes electrically connected to the pixel electrode PE) is opposed to the first common electrode CE1 via the fourth insulating film 14, and holds the pixel potential written to each pixel for a certain period of time.

According to the present embodiment, the second common electrode CE2 formed in the same layer as the pixel electrode PE includes the second main common electrodes CA1 and CA2 opposed to the source lines S1 and S2, respectively, and having intermittence at positions opposed to the sub-pixel electrode PB, and the second sub-common electrodes CB1 and CB2 which cross the second main common electrodes and have intermittence at positions opposed to the main pixel electrode PA. Accordingly, the main pixel electrode PA can be extended in the second direction Y within a range of not causing an electrical short-circuit with the other main pixel electrodes neighboring in the second direction. Also, the sub-pixel electrode PB can be extended in the first direction X within a range of not causing an electrical short-circuit with the other sub-pixel electrodes neighboring in the first direction X. In this way, in each pixel PX, it becomes possible to produce an electric field which is necessary for controlling the alignment of the liquid crystal molecules to the vicinity of boundaries with the other pixels neighboring in the first direction X and the second direction Y, and an area which contributes to display can be increased. Accordingly, it becomes possible to improve the transmissivity or brightness per pixel, and the display quality can be improved.

Further, while a pixel pitch in the first direction X tends to be reduced in accordance with achieving higher definition, because the width of the sub-pixel electrode PB in the first direction X can be increased, the processing accuracy of the sub-pixel electrode PB can be improved. That is, when the width of the sub-pixel electrode PB in the first direction X is reduced, because processing that can be performed comes close to the processing limit, corners tend to be rounded when the pixel electrode PE is patterned, and obtaining a square-shaped sub-pixel electrode PB as shown in FIG. 2, etc., tends to be difficult. According to the present embodiment, since the width of the sub-pixel electrode PB in the first direction X can be increased, it becomes possible to prevent the corners from being rounded when the pixel electrode PE is patterned, and the sub-pixel electrode having the shape as illustrated in the drawings can be obtained. As a result, a desired electric field can be produced between the sub-pixel electrode PB and the second and third common electrodes CE2 and CE3, and the alignment of the liquid crystal molecules can be stabilized.

Also, since the second common electrode CE2 has intermittence at positions opposed to the main pixel electrode PA and the sub-pixel electrode PB, the second common electrode CE2 is separated into a plurality of segments each formed in an island shape, i.e., segments C1 to C4, in the periphery of the pixel electrode PE. These segments C1 to C4 are electrically connected to the first common electrode CE1 through the respective contact holes which penetrate the fourth insulating film 14. The fourth insulating film 14 can be formed by inorganic materials such as silicon nitride. Accordingly, the contact hole which penetrates the fourth insulating film 14 has a relatively small diameter, and is relatively shallow. Thus, disturbance in alignment of liquid crystal molecules around the contact holes can be suppressed.

Also, the first common electrode CE1 is opposed to the gate line G1, the source line S1, and the source line S2. Therefore, an undesired leakage electric field from the gate line G1 toward the liquid crystal layer LQ can be shielded. Also, an undesired leakage electric field from the source line S1 and the source line S2 toward the liquid crystal layer LQ can be shielded. Therefore, the effect of an undesired electric field in regions near the gate line G1, the source line S1, and the source line S2 of the transmissive regions can be reduced, and the display quality can be improved.

Also, in the pixels PX neighboring in the second direction Y, the second sub-common electrodes CB1 and CB2 having the same potential are opposed to the third sub-common electrodes CB3 and CB4 having the same potential, respectively, at the boundaries between those pixels. Consequently, for each of the pixels PX, while an electric field necessary for alignment control of the liquid crystal molecules is produced, the pixel PX is prevented from being affected by an electric field from the other pixels neighboring in the second direction Y, as described above. Accordingly, the display quality can be improved.

Further, the third common electrode CE3 is shaped like a lattice facing the second common electrode CE2, and has the same potential as the second common electrode CE2. Thus, an equipotential surface of the common potential is formed between the second common electrode CE2 and the third common electrode CE3. This equipotential surface keeps the liquid crystal molecules LM in the initial alignment state at the on- and off-time even if misalignment occurs between the array substrate AR and counter-substrate CT. Accordingly, when pixels of different colors are disposed in the first direction X or the second direction Y with respect to the pixel PX, occurrence of color mixture can be prevented.

Further, the pixel electrode (or the other electrodes electrically connected to the pixel electrode) is opposed to the first common electrode CE1 via the fourth insulating film 14, and can hold the pixel potential written to each pixel for a certain period of time. Also, the fourth insulating film 14 can be formed by, for example, inorganic materials such as silicon nitride, and is formed to be relatively thin. Thus, a relatively large capacitance can be formed easily. For this reason, a storage capacitance line which traverses the pixel PX for forming the storage capacitance CS is not required. Thereby, as compared to the case of arranging the storage capacitance line, an area of the transmissive region per pixel can be increased, and the transmissivity can be improved.

Next, modifications of the present embodiment will be described. In the description below, main different points will be described, and the structures which are the same as those in the above-described example are denoted by the same reference numbers, and a detailed description of them is omitted.

FIG. 7 is a plan view which schematically illustrates another structure example of the pixel PX when the array substrate AR illustrated in FIG. 1 is viewed from the counter-substrate side.

The example shown in FIG. 7 is different from the example shown in FIG. 2 in that the pixel electrode PE is formed to be T-shaped. The second common electrode CE2 has intermittence at positions opposed to the main pixel electrode PA and the sub-pixel electrode PB, and is separated into four segments C1 to C4 which are located in the periphery of the pixel electrode PE. These four segments, i.e., segments C1 to C4, are all formed in the same shape, and in the example illustrated, each of them is formed in a cross shape.

The segment C1 and the segment C3 are separated from each other at a position between the sub-pixel electrode PB and the sub-pixel electrode PBa which is adjacent on the left side of the pixel electrode PE in the first direction X. The segment C2 and the segment C4 are separated from each other at a position between the sub-pixel electrode PB and the sub-pixel electrode PBb which is adjacent on the right side of the pixel electrode PE in the first direction X. The segment C1 and the segment C2 are separated from each other at a position between the main pixel electrode PA and a sub-pixel electrode PBc which is adjacent on the upper side of the pixel electrode PE in the second direction Y. The segment C3 and the segment C4 are separated from each other at a position between the sub-pixel electrode PB and the main pixel electrode PAb which is adjacent on the lower side of the pixel electrode PE in the second direction Y.

Also in this modification, with respect to the pixel electrode PE formed in the same layer as the second common electrode CE2, the main pixel electrode PA can be extended in the second direction Y within a range of not causing an electrical short-circuit with another sub-pixel electrode neighboring in the second direction Y. Also, the sub-pixel electrode PB can be extended in the first direction X within a range of not causing an electrical short-circuit with the other sub-pixel electrodes neighboring in the first direction X. Accordingly, an advantage similar to that of the above-described structure example can be obtained.

Figure 8:
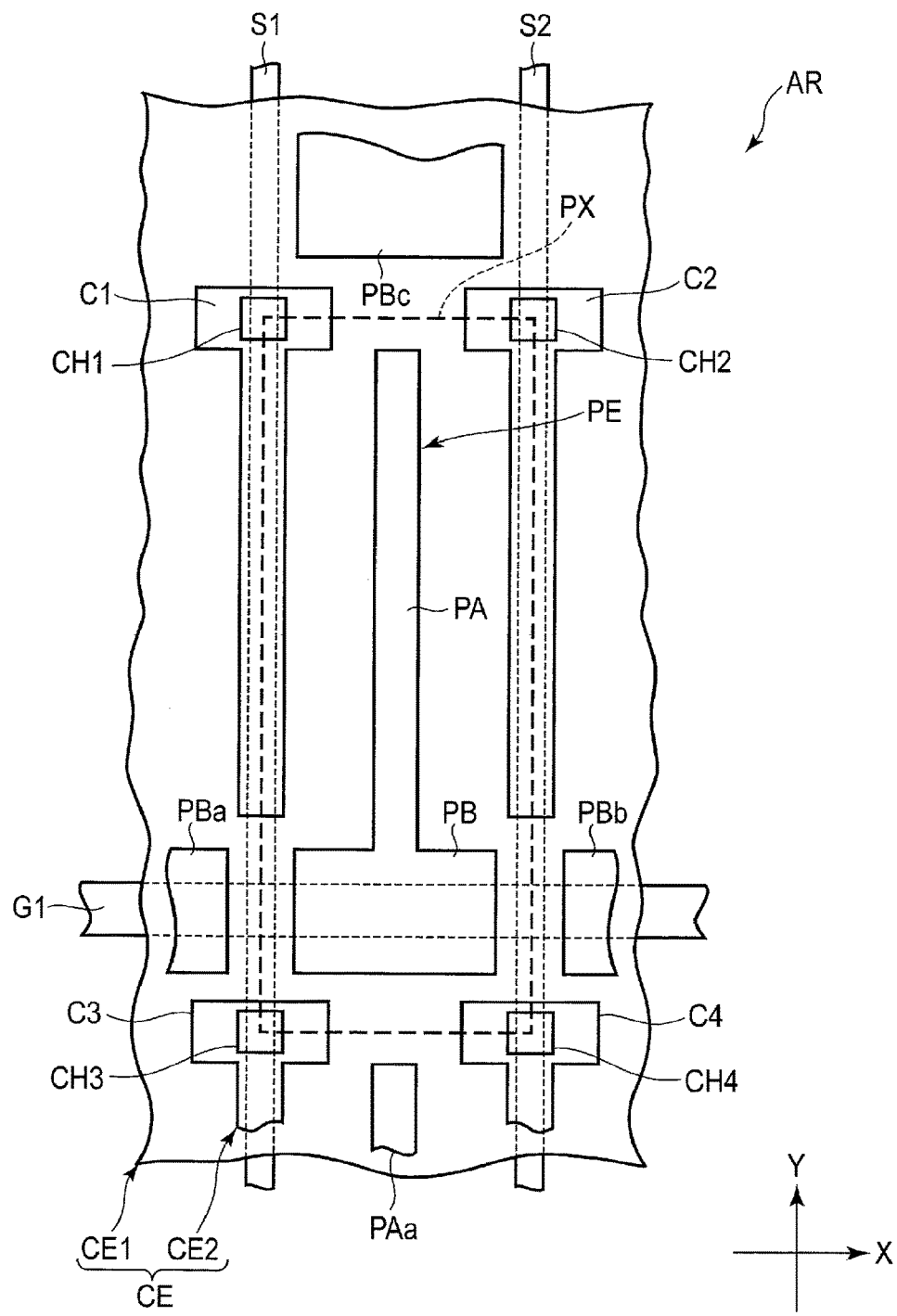
FIG. 8 is a plan view which schematically illustrates another structure example of the pixel PX when the array substrate AR illustrated in FIG. 1 is viewed from the counter-substrate side.

FIG. 8 is a plan view which schematically illustrates another structure example of the pixel PX when the array substrate AR illustrated in FIG. 1 is viewed from the counter-substrate side.

The example shown in FIG. 8 is different from the example shown in FIG. 7 in that each of the segments C1 to C4 of the second common electrode CE2 has the same shape and formed to be T-shaped. That is, the second common electrode CE2 has intermittence at positions opposed to the main pixel electrode PA and the sub-pixel electrode PB, and is separated into four segments C1 to C4 which are located in the periphery of the pixel electrode PE. The segment C1 and the segment C3 are separated from each other at a position between the sub-pixel electrode PB and the sub-pixel electrode PBa. The segment C2 and the segment C4 are separated from each other at a position between the sub-pixel electrode PB and the sub-pixel electrode PBb. The segment C1 and the segment C2 are separated from each other at a position between the main pixel electrode PA and the sub-pixel electrode PBc. The segment C3 and the segment C4 are separated from each other at a position between the sub-pixel electrode PB and the main pixel electrode PAa.

Also in this modification, an advantage similar to that of the example shown in FIG. 7 can be obtained. In addition, since each of the segments C1 to C4 is formed to be T-shaped, in the example illustrated, the sub-pixel electrode PB can be brought near to the lower side of the pixel PX (or the side of the main pixel electrode PAa) even further, and the main pixel electrode PA can substantially be extended in the second direction Y. Accordingly, as compared to the example shown in FIG. 7, an area which contributes to the display can further be increased.

In the meantime, in the above-described embodiment, the example was described in which the alignment of liquid crystal molecules is controlled by the interaction between the electric field produced between the pixel electrode PE and the second common electrode CE2 and the electric field produced between the pixel electrode PE and the third common electrode CE3. However, the embodiment is not limited to this example. For example, the third common electrode CE3 may be omitted from the liquid crystal display panel LPN, and the alignment of liquid crystal molecules may be controlled by the electric field which is produced between the pixel electrode PE and the second common electrode CE2.

Figure 10:
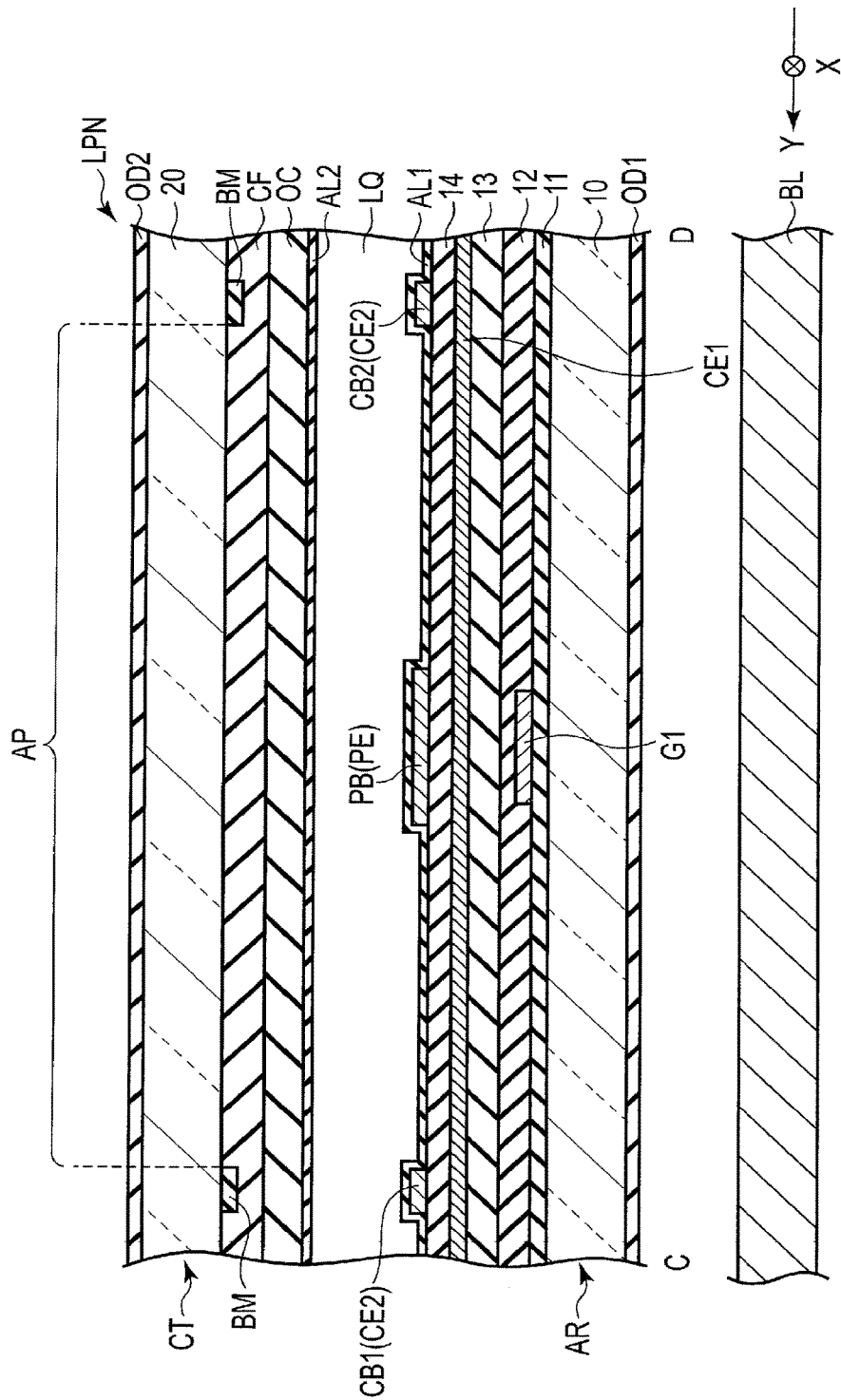
FIG. 10 is a cross-sectional view which schematically shows another cross-sectional structure of the liquid crystal display panel LPN taken along a second direction Y.

FIG. 9 is a cross-sectional view which schematically shows another cross-sectional structure of the liquid crystal display panel LPN taken along the first direction X. FIG. 10 is a cross-sectional view which schematically shows another cross-sectional structure of the liquid crystal display panel LPN taken along the second direction Y.

The structure example shown is different from the structure example shown in FIGS. 4 and 5 in that the third common electrode of the counter-substrate CT is omitted. In the counter-substrate CT, the entire surface of the overcoat layer OC on the side of the array substrate AR is covered with the second alignment film AL2. In the structure example of this case, in the on-time, an electric field necessary for controlling the alignment of liquid crystal molecules between the pixel electrode PE and the second common electrode CE2 is produced. Also in this modification, an advantage similar to the structure example described above can be obtained.

As has been described above, according to the present embodiment, a liquid crystal display device capable of improving the display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate including a gate line, a first source line, a common electrode, a conductive wiring, and an insulating film between the common electrode and the conductive wiring;
   wherein the conductive wiring is electrically connected to the common electrode via a contact hole which penetrates the insulating film,
   the conductive wiring, the common electrode and the contact hole overlap the first source line,
   the conductive wiring has intermittence at a position in a vicinity of the gate line.

2. The display device of claim 1, wherein the intermittence overlaps the gate line.

3. The display device of claim 1, further comprising a switching element electrically connected to the gate line and the first source line, a second source line, a first pixel electrode, and a second pixel electrode;
   wherein the second source line is adjacent to the first source line in a first direction,
   the first pixel electrode is adjacent to the second pixel electrode in a second direction intersecting the first direction,
   the first pixel electrode and the second pixel electrode are located between the first source line and the second source line, and
   the second pixel electrode includes a main pixel electrode and a contact portion electrically connected to the switching element.

4. The display device of claim 3, wherein the intermittence is located on a side of the first pixel electrode, and the conductive wiring is located near the contact portion.

5. A display device comprising:
   a first substrate including a gate line, a first source line, a common electrode, a first conductive wiring, and an insulating film between the common electrode and the first conductive wiring;
   wherein the first conductive wiring is electrically connected to the common electrode via a first contact hole which penetrates the insulating film,
   the first conductive wiring, the common electrode and the first contact hole overlap the first source line,
   the first conductive wiring has an edge, and
   the edge of the first conductive wiring is located at a position in a vicinity of the gate line.

6. The display device of claim 5, further comprising a second source line adjacent to the first source line, and a second conductive wiring adjacent to the first conductive wiring,
   wherein the second conductive wiring is electrically connected to the common electrode via a second contact hole which penetrates the insulating film,
   the second conductive wiring, the common electrode and the second contact hole overlap the second source line,
   the second conductive wiring has an edge, and the edge of the second conductive wiring is located at a position in a vicinity of the gate line.

7. The display device of claim 6, wherein the first conductive wiring has a wide portion,
the wide portion of the first conductive wiring is in a position overlapping the first contact hole,
a width of the wide portion of the first conductive wiring is greater than a width of the first conductive wiring in a region where the first contact hole is not formed.

8. The display device of claim 7, wherein the second conductive wiring has a wide portion,
the wide portion of the second conductive wiring is in a position overlapping the second contact hole,
a width of the wide portion of the second conductive wiring is greater than a width of the second conductive wiring in a region where the second contact hole is not formed.

9. The display device of claim 8, wherein the first conductive wiring and the second conductive wiring are each formed in an island shape.

10. The display device of claim 5, wherein a diameter of the first contact hole is greater than a width of the first source line.

11. The display device of claim 5, wherein a width of the first conductive wiring is greater than a width of the first source line.

12. A display device comprising:
a first substrate including a gate line, a first inorganic insulating film covering the gate line, a source line on the first inorganic insulating film, an organic insulating film covering the first inorganic insulating film and the source line, a common electrode opposed to the gate line and the source line, a second inorganic insulating film covering the common electrode, a conductive wiring formed on the second inorganic insulating film and having a same potential as the common electrode, and an alignment film covering the conductive wiring;
wherein the common electrode is between the organic insulating film and the second inorganic insulating film,
the conductive wiring is between the second inorganic insulating film and the alignment film,
the conductive wiring is opposed to the source line and is in contact with the common electrode via a contact hole which penetrates the second inorganic insulating film, and
the contact hole overlaps the source line.

13. The display device of claim 12, further comprising a pixel electrode, wherein the pixel electrode is formed on the second inorganic insulating film.

14. The display device of claim 13, further comprising a switching element connected to the gate line and the source line, wherein the conductive wiring includes an intermittence which is opposed to the source line at a place near a contact portion between the pixel electrode and the switching element.

15. The display device of claim 12, wherein the conductive wiring includes an intermittence which is opposed to the source line at an intersection area between the gate line and the source line.

* * * * *